United States Patent
Barbu et al.

(10) Patent No.: US 12,541,002 B2
(45) Date of Patent: Feb. 3, 2026

(54) POSITIONING A TERMINAL DEVICE

(71) Applicant: Nokia Technologies Oy, Espoo (FI)

(72) Inventors: Oana-Elena Barbu, Aalborg (DK); Johannes Harrebek, Aalborg (DK); Simon Svendsen, Aalborg (DK); Benny Vejlgaard, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 586 days.

(21) Appl. No.: 18/076,848

(22) Filed: Dec. 7, 2022

(65) Prior Publication Data

US 2023/0184877 A1  Jun. 15, 2023

(30) Foreign Application Priority Data

Dec. 9, 2021  (FI) ...................................... 20216258

(51) Int. Cl.
  *G01S 5/02*  (2010.01)
  *H04L 5/00*  (2006.01)

(52) U.S. Cl.
  CPC .......... *G01S 5/0268* (2013.01); *G01S 5/0244* (2020.05); *H04L 5/0048* (2013.01)

(58) Field of Classification Search
  CPC ..... G01S 5/0268; G01S 5/0244; H04L 5/0048
  See application file for complete search history.

(56) References Cited

U.S. PATENT DOCUMENTS

| | | | | |
|---|---|---|---|---|
| 11,283,504 B2* | 3/2022 | Zu | ......................... | H04L 5/0048 |
| 12,019,148 B2* | 6/2024 | Yerramalli | ............. | H04B 17/27 |
| 2016/0381592 A1* | 12/2016 | Nguyen | ............... | H04L 27/2675 |
| | | | | 370/252 |
| 2021/0072340 A1* | 3/2021 | Wang | ..................... | G01S 5/0215 |
| 2022/0082653 A1* | 3/2022 | Manolakos | ........... | G01S 13/003 |
| 2022/0200756 A1* | 6/2022 | Raghavan | ............... | G01S 1/042 |
| 2023/0046045 A1* | 2/2023 | Bao | ..................... | H04W 64/006 |

FOREIGN PATENT DOCUMENTS

| | | |
|---|---|---|
| CN | 110749859 A | 2/2020 |
| CN | 111148021 A | 5/2020 |
| EP | 3 783 974 A1 | 2/2021 |
| WO | WO-2020/069083 A1 | 4/2020 |

\* cited by examiner

*Primary Examiner* — Alison Slater
(74) *Attorney, Agent, or Firm* — McCarter & English, LLP; Joseph C. Drish (57) ABSTRACT

A method including receiving a first reference signal, wherein the first reference signal is having a first bandwidth in a first frequency range, determining an angle of arrival of a line of sight component of the first reference signal, receiving a second reference signal, wherein the second reference signal is having a second bandwidth in a second frequency range, wherein the second bandwidth is greater than the first bandwidth, determining a time of arrival of a line of sight component of the second reference signal, based on the first reference signal and on the second reference signal, determining a link quality measure, and based on the link quality measure, the time of arrival and the angle of arrival, performing a position estimation to obtain an estimated position, wherein the first reference signal and the second reference signal are received from a same transmit-receive point.

13 Claims, 7 Drawing Sheets

POSITIONING A TERMINAL DEVICE

FIELD

The following example embodiments relate to positioning a terminal device that has a wireless connection to a network such as a cellular communication network.

BACKGROUND

Cellular communication enables various mobile use cases to be implemented. A terminal device may be a mobile device used by a user or a terminal device used for industrial purposes for example. Such terminal devices allow automation to take place in industrial use case for example and for such purposes it is beneficial to have as accurate position of the terminal device as possible.

BRIEF DESCRIPTION

The scope of protection sought for various embodiments is set out by the independent claims. The example embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to receive a first reference signal, wherein the first reference signal is having a first bandwidth in a first frequency range, determine an angle of arrival of a line of sight component of the first reference signal, receive a second reference signal, wherein the second reference signal is having a second bandwidth in a second frequency range, wherein the second bandwidth is greater than the first bandwidth, determine a time of arrival of a line of sight component of the second reference signal, based on the first reference signal and on the second reference signal, determine a link quality measure, and based on the link quality measure, the time of arrival and the angle of arrival, perform a position estimation to obtain an estimated position, wherein the first reference signal and the second reference signal are received from a same transmit-receive point.

According to a second aspect there is provided an apparatus comprising, means for receiving a first reference signal, wherein the first reference signal is having a first bandwidth in a first frequency range, means for determining an angle of arrival of a line of sight component of the first reference signal, means for receiving a second reference signal, wherein the second reference signal is having a second bandwidth in a second frequency range, wherein the second bandwidth is greater than the first bandwidth, means for determining a time of arrival of a line of sight component of the second reference signal, means for, based on the first reference signal and on the second reference signal, determining a link quality measure, and means for, based on the link quality measure, the time of arrival and the angle of arrival, performing a position estimation to obtain an estimated position, wherein the first reference signal and the second reference signal are received from a same transmit-receive point.

According to a third aspect there is provided a method comprising receiving a first reference signal, wherein the first reference signal is having a first bandwidth in a first frequency range, determining an angle of arrival of a line of sight component of the first reference signal, receive a second reference signal, wherein the second reference signal is having a second bandwidth in a second frequency range, wherein the second bandwidth is greater than the first bandwidth, determining a time of arrival of a line of sight component of the second reference signal, based on the first reference signal and on the second reference signal, determining a link quality measure, and based on the link quality measure, the time of arrival and the angle of arrival, performing a position estimation to obtain an estimated position, wherein the first reference signal and the second reference signal are received from a same transmit-receive point.

According to a fourth aspect there is provided a computer program comprising instructions for causing an apparatus to perform at least the following: receive a first reference signal, wherein the first reference signal is having a first bandwidth in a first frequency range, determine an angle of arrival of a line of sight component of the first reference signal, receive a second reference signal, wherein the second reference signal is having a second bandwidth in a second frequency range, wherein the second bandwidth is greater than the first bandwidth, determine a time of arrival of a line of sight component of the second reference signal, based on the first reference signal and on the second reference signal, determine a link quality measure, and based on the link quality measure, the time of arrival and the angle of arrival, perform a position estimation to obtain an estimated position, wherein the first reference signal and the second reference signal are received from a same transmit-receive point.

According to a fifth aspect there is provided a computer program product comprising instructions for causing an apparatus to perform at least the following: receive a first reference signal, wherein the first reference signal is having a first bandwidth in a first frequency range, determine an angle of arrival of a line of sight component of the first reference signal, receive a second reference signal, wherein the second reference signal is having a second bandwidth in a second frequency range, wherein the second bandwidth is greater than the first bandwidth, determine a time of arrival of a line of sight component of the second reference signal, based on the first reference signal and on the second reference signal, determine a link quality measure, and based on the link quality measure, the time of arrival and the angle of arrival, perform a position estimation to obtain an estimated position, wherein the first reference signal and the second reference signal are received from a same transmit-receive point.

According to a sixth aspect there is provided a computer program comprising instructions stored thereon for performing at least the following: receive a first reference signal, wherein the first reference signal is having a first bandwidth in a first frequency range, determine an angle of arrival of a line of sight component of the first reference signal, receive a second reference signal, wherein the second reference signal is having a second bandwidth in a second frequency range, wherein the second bandwidth is greater than the first bandwidth, determine a time of arrival of a line of sight component of the second reference signal, based on the first reference signal and on the second reference signal, determine a link quality measure, and based on the link quality measure, the time of arrival and the angle of arrival, perform a position estimation to obtain an estimated position, wherein the first reference signal and the second reference signal are received from a same transmit-receive point.

According to a seventh aspect there is provided a non-transitory computer readable medium comprising program instructions for causing an apparatus to perform at least the following: receive a first reference signal, wherein the first reference signal is having a first bandwidth in a first frequency range, determine an angle of arrival of a line of sight component of the first reference signal, receive a second reference signal, wherein the second reference signal is having a second bandwidth in a second frequency range, wherein the second bandwidth is greater than the first bandwidth, determine a time of arrival of a line of sight component of the second reference signal, based on the first reference signal and on the second reference signal, determine a link quality measure, and based on the link quality measure, the time of arrival and the angle of arrival, perform a position estimation to obtain an estimated position, wherein the first reference signal and the second reference signal are received from a same transmit-receive point.

According to an eight aspect there is provided non-transitory computer readable medium comprising program instructions stored thereon for performing at least the following: receive a first reference signal, wherein the first reference signal is having a first bandwidth in a first frequency range, determine an angle of arrival of a line of sight component of the first reference signal, receive a second reference signal, wherein the second reference signal is having a second bandwidth in a second frequency range, wherein the second bandwidth is greater than the first bandwidth, determine a time of arrival of a line of sight component of the second reference signal, based on the first reference signal and on the second reference signal, determine a link quality measure, and based on the link quality measure, the time of arrival and the angle of arrival, perform a position estimation to obtain an estimated position, wherein the first reference signal and the second reference signal are received from a same transmit-receive point.

LIST OF DRAWINGS

In the following, the example embodiments will be described in greater detail with reference to the embodiments and the accompanying drawings, in which.

DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

A terminal device that is capable of connecting to a cellular communication network such as 5G, may be used as part of Internet of Things, IoT. IoT may also be utilized in an industrial environment and such use cases may be referred to as industrial IoT, IIoT. Terminal devices that may be used in the context of IoT or IIoT may comprise for example sensors that enable data collection, exchange, and analysis. IIoT may be utilized for example in warehouses that may be partially or fully automated, industrial robots, automotive in out of coverage areas such as tunnels and garages. In such use cases, in which there may be devices moving automatically, it is important to have reliable location information available regarding the location of the device.

The devices may thus comprise a terminal device that is capable of locating its location. The use cases such IoT and IIoT use case may require high accuracy of the determined location information, for example sub-meter level position accuracy (<1 m) or sub 0.2 meter level position accuracy (<0.2 m). Also latency is to be short enough, for example less than 100 ms or substantially in the order of 10 ms.

To determine its position, that is to position itself, the terminal device may obtain downlink (DL) positioning reference signals (PRS) that are sent, from an access node such as a gNB, periodically. PRS may have periodicity, that is, a fixed time-frequency-space pattern. A location management function (LMF) of the network may then instruct the terminal device using a single assistance message to listen to the PRS from a set of transmission/reception points (TRPs) such as from several tens of TRPs. It is to be noted that the positioning reference signal may be considered as an example of a reference signal that can be utilized for a positioning purpose and any other suitable reference signal could be used as well. It is also to be noted that the TRPs may be received from any suitable source such as from another terminal device and/or from an access node.

The terminal device also receives coordinates of these TRPs that allow the terminal device to determine its location using multilateration techniques upon PRS measurement such as observed time difference of arrival (OTDOA) or angle of arrival (AOA) extraction. To perform multilateration techniques, the terminal device is to periodically detect and measure tens, or potentially hundreds of PRSs due to for example beamformed transmission. There may be many of these PRS that are received with low quality, and the measurements may end up being discarded, after the terminal device has spent the computational power and time to detect these signals. Also, the terminal device may need to request and wait for the grant of tens of measurement gaps via the radio resource control (RRC) reconfiguration procedure to be able to switch carrier frequencies and measure PRS from other TRPs using different carriers than the serving gNB. Therefore, the positioning may be computationally expensive and also may involve too much latency for example for IIoT applications that are characterized by stringent accuracy and low latency requirements.

To enable high-accuracy positioning of terminal device, for example in the context of IIoT, using 5G receivers, frequency spectrum of mmWave, that is 24-28 and 42-48 GHz, which may be referred to as frequency range 2 (FR2). FR2 may have benefits such as availability of large bandwidth which enables high-resolution time of arrival (TOA) and/or OTDOA estimation. Also, channel in FR2 bands may be sparse and therefore there is a minimal likelihood of TOA misdetection which means that also the positioning errors become minimal. Further, to remove the need for multi-TRP measurements that are both computationally expensive and latency sensitive as discussed above, the terminal device may implement a position estimation using a single-anchor (SA) approach. In the SA approach the terminal device may measure both the AOA and TOA of the PRS sent by the serving cell and localize itself using only the serving cell coordinates. It is to be noted that in some example embodiments the SA approach may comprise a terminal device from which a reference signal for a locating purpose is received.

Figure 1:
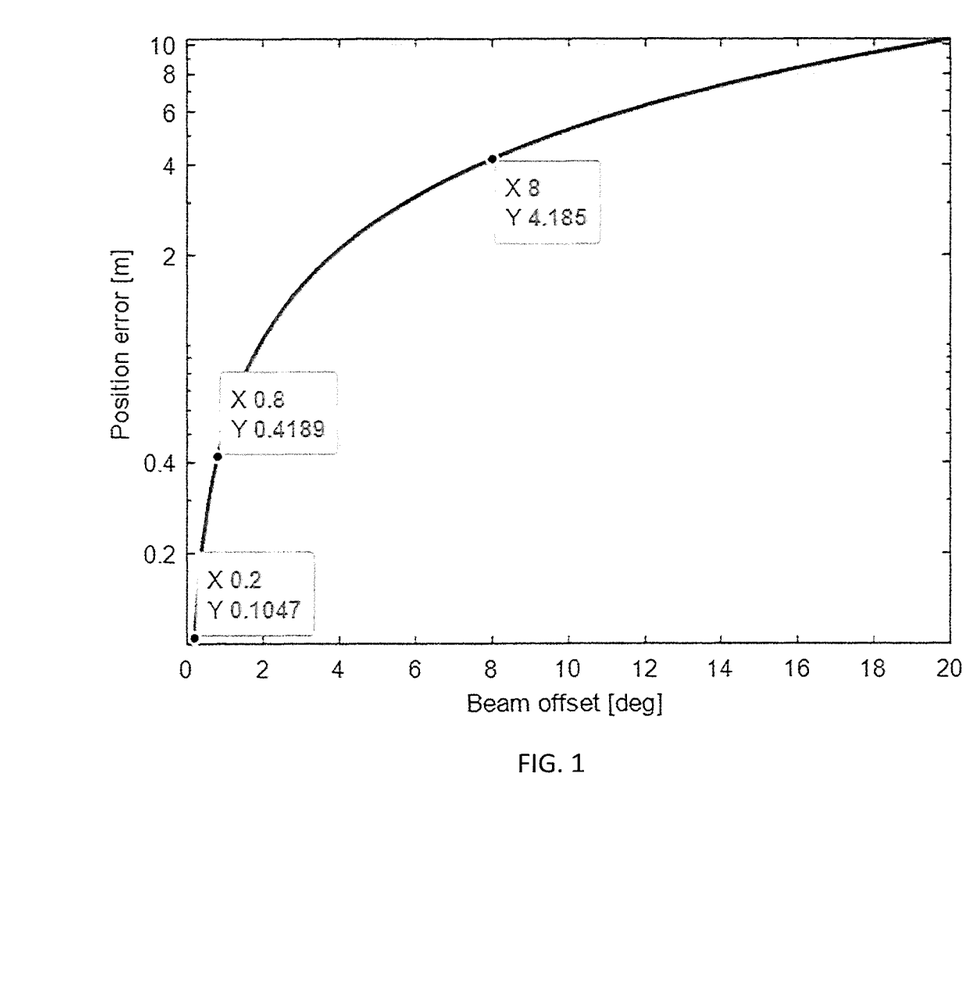
FIG. 1 illustrates an example of a position error as a function of a beam offset for a transmission and reception point terminal device.

Yet, the TOA resolution gain may be offset by a degraded AOA estimation accuracy. If the terminal device comprises radio frequency (RF) front-end (FE) implementation that is not optimal in terms of its hardware performance capabilities for example, the terminal device may have a RF FE implementation that deploys low-resolution analogue phase-shifters (PS) such as 2/3-bits PS. Such a PS may introduce quantization errors in the received signal that may manifest themselves as a beam pointing error. In other words, the terminal device receives beam points in a different direction than the intended one, and this beam deviation (BD)—or equivalently beam offset—may be difficult to control as it may depend on a series of factors that are intrinsic and extrinsic to the terminal device, such as: carrier frequency, human interaction with the device, temperature and humidity. A BD will skew the AOA estimation and degrade the accuracy of the SA positioning, introducing location estimation errors as shown in FIG. 1. FIG. 1 illustrates a position error as a function of beam offset for a TRP-terminal device distance of 30 m.

Frequency range 1 (FR1) may be understood as frequencies that are below 7 GHz. FR1 may thus be also understood as a first frequency range and FR2 as a second frequency range. To address issues discussed above, a terminal device may combine FR1 and FR2 signal processing. This may have advantages such as obtaining a large available FR2 bandwidth and thereby yielding high resolution TOA estimates and obtaining unbiased FR1 AOA estimation that is at least substantially unaffected by analogue beam deviations. Thus, by combining processing of FR1 and FR2 processing, the terminal device may remove both the TOA estimation error caused by limited FR1 bandwidth and the BD caused by low-resolution PS in the FR2 RF-FE.

Figure 2A:
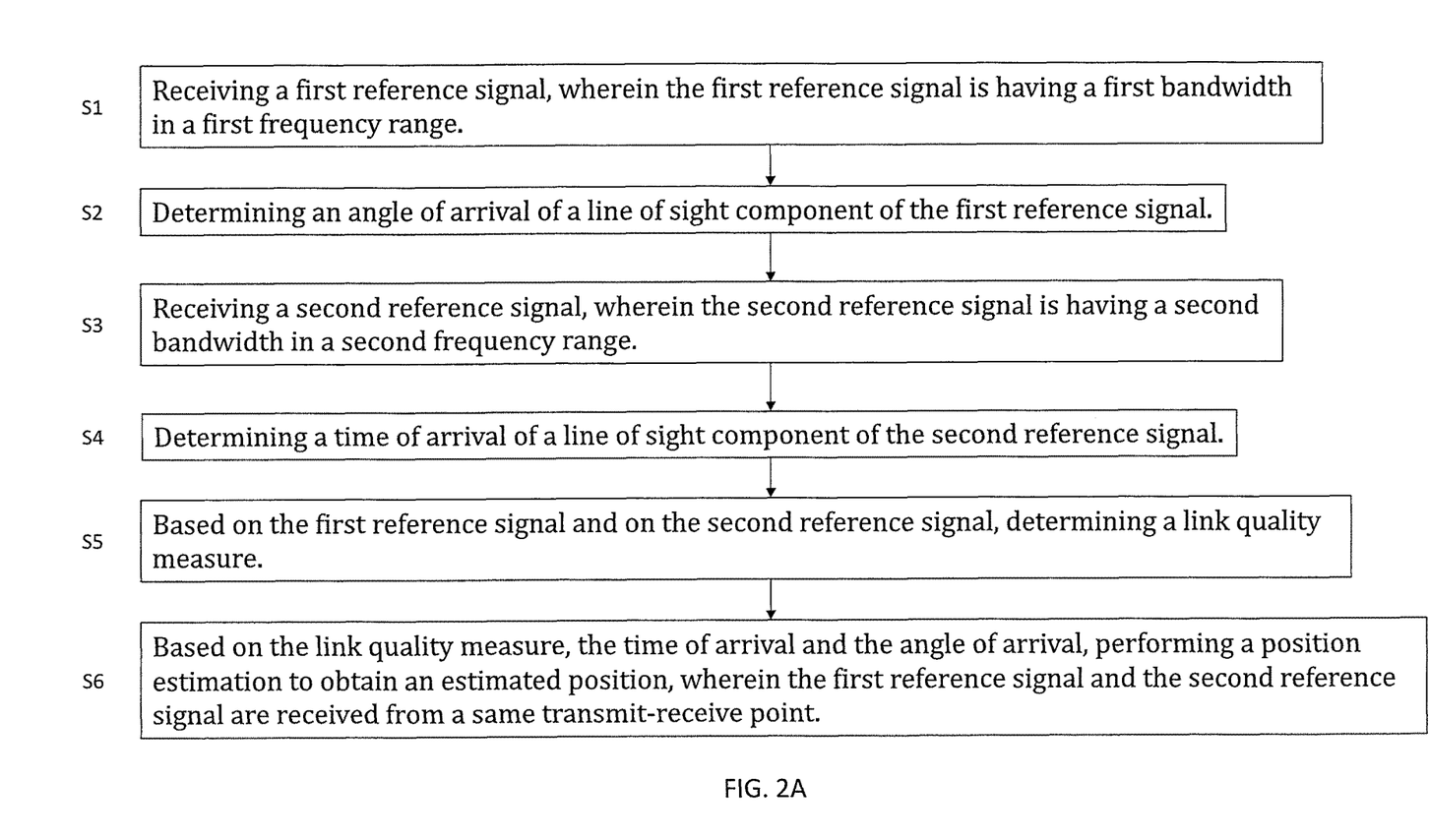
FIG. 2A illustrates a flow chart according to an example embodiment.

FIG. 2A illustrates a flow chart according to an example embodiment. The example embodiment illustrates a method in which first, in S1, the method comprises receiving a first reference signal, wherein the first reference signal is having a first bandwidth in a first frequency range. Next, in S2, the method continues by determining an angle of arrival of a line of sight component of the first reference signal and then, in S3, by receiving a second reference signal, wherein the second reference signal is having a second bandwidth in a second frequency range. Next, in S4, the method continues by determining a time of arrival of a line of sight component of the second reference signal. Then, in S5, the method continues by, based on the first reference signal and on the second reference signal, determining a link quality measure and then in S6 by, based on the link quality measure, the time of arrival and the angle of arrival, performing a position estimation to obtain an estimated position, wherein the first reference signal and the second reference signal are received from a same transmit-receive point.

Figure 2B:
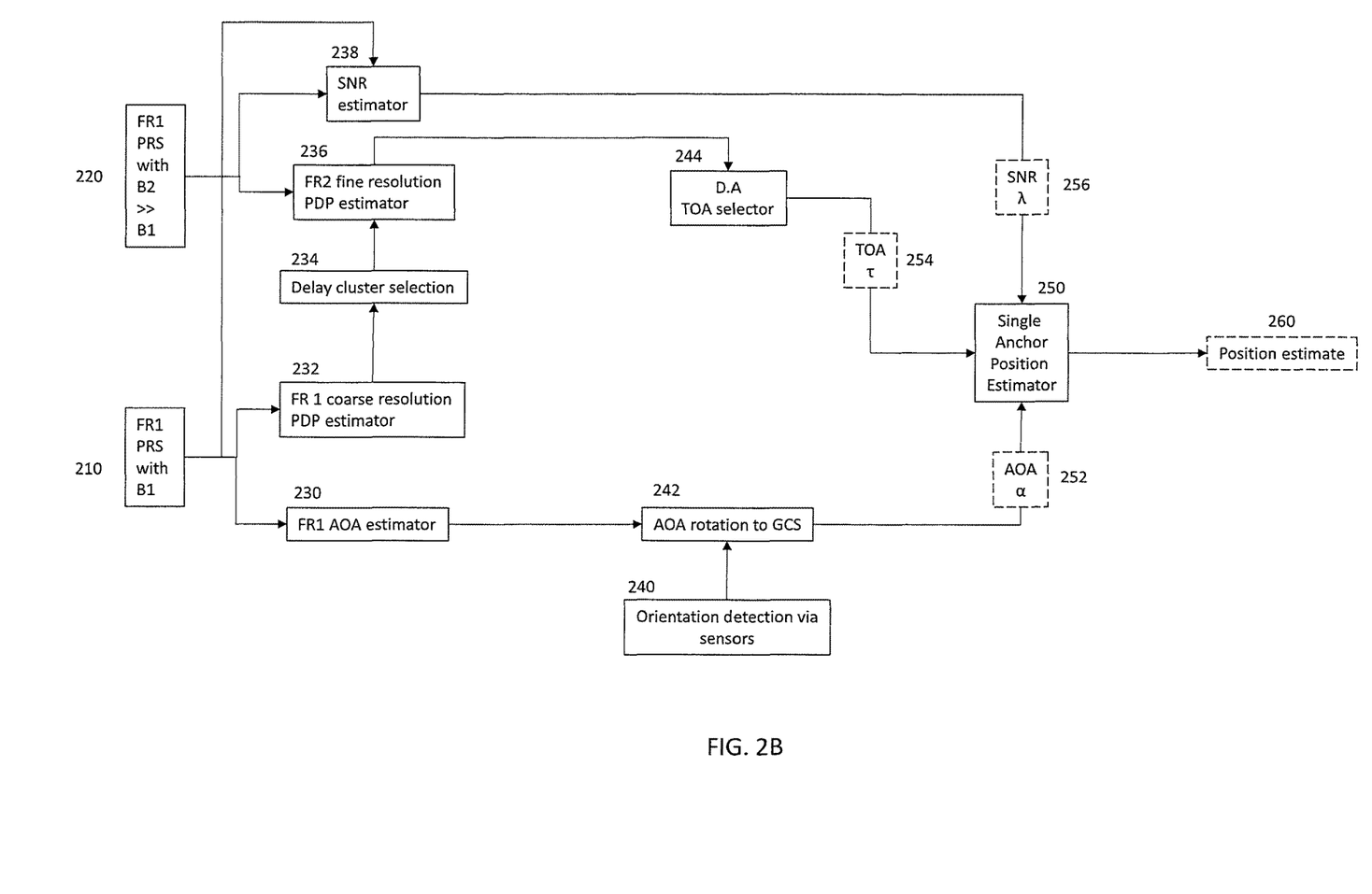
FIG. 2B illustrates a block diagram of an example embodiment of combined processing of frequency range 1 and frequency range 2 for a positioning purpose.

FIG. 2B provides an illustration of an example embodiment in which the combined processing of FR1 and FR2 for the positioning purpose is illustrated using block diagrams. The processing may be performed in a terminal device to determine its position. First, the terminal device requests and obtains FR1 and FR2 PRS configuration of the serving cell using location positioning protocol (LPP) assistance data. The serving cell may be provided by a serving access node, for example by a gNB. The terminal device then receives FR1 PRS in a first bandwidth, which is referred to as B1 in this example embodiment. This is illustrated as block 210. The terminal device may then determine the AOA of the line-of-sight component as illustrated in block 230. This may be performed using an AOA comprised in the terminal device. The terminal device then uses the orientation estimates determined based on data from sensors comprised in the terminal device to align the AOA estimate with the global coordinate system (GCS). This is illustrated in block 240 and block 242. Block 232 then illustrates the terminal device using FR1 PRS to detect the serving channel power delay profile (PDP). It is to be noted that PDP is an example of a channel metric that can be used for characterizing propagation environment for a reference signal used, which in this example embodiment is the PRS. Then, a first PDP estimation with a first precision is determined. The first PDP estimation with the first precision is then used to determine a PDP characterizing the power and delay of each detected tap. In general, a tapped delay line (TDL) may be understood as a delay line with at least one tap. A delay-line tap extracts a signal output from somewhere within the delay line, may then scale it and sum with other taps to form a TDL output signal. A tap may be interpolating or non-interpolating. The first precision may be a coarse precision due to B1 that may be small. The block 234 then illustrates the terminal device using the PDP estimation with the first precision to select a delay region. The delay region may be a probable delay grid and the terminal device may then use the delays detected in block 232 to generate a delay grid in which the taps are deemed to be found with high probability.

The terminal device also receives FR2 PRS in a second bandwidth that is referred to as B2 in this example embodiment. In this example embodiment, B2 is greater than B1 and uses the delay grid from the block 234 to perform a PDP estimation. This is a second PDP estimation, and it may be a fast estimation that has low complexity. This second PDP estimation returns the power and delay of each tap detected on the delay grid that was selected in block 234. The resolution of each delay may have a very-fine resolution, for example, a resolution that is proportional to B2. In block 244 then the second PDP estimation is analysed. The second PDP estimation has a precision higher than that of the first PDP estimation. The second PDP estimation may be analysed by a TOA selector comprised in the terminal device for example. After analyzing the second PDP estimation, a TOA of a line-of-sight component is obtained as illustrated by the block 254.

In block 238, the terminal device may determine a link quality measure, which in this example embodiment is a signal to noise ratio (SNR) estimate, per bandwidth based on the FR1 and FR2 PRS. In other words, the SNR is determined such that it is for both, the first and the second bandwidth and there is thus a single SNR value for the signals sent in both bands. It is to be noted that although SNR is used as a link quality measure in this example embodiment, other link quality measures could also be used. For example, the link quality metric could alternatively be signal to interference plus noise ratio (SINR), reference signal received power (RSRP) or reference signal received quality (RSRQ). In block 250 then the terminal device performs SA positioning and the TOA, AOA, SNR estimates and the TRP location to determine its own position. That is, the SA position estimation illustrated in block 250 receives input from the blocks 252, 254 and 256. The determined position may be associated with a trust level such as a position variance that may also be determined by the terminal device. The determined position is then provided, illustrated in block 260. Additionally, the terminal device may signal back to the LMF of the network the results obtained during the positioning process of this example embodiment using for example LPP reporting.

The example embodiment described above thus enables SA positioning by estimating the AOA and initializing a tap delay grid using FR1 reception that has high angle resolution with low bandwidth. Then, a high-resolution TOA is estimated based on large FR2 bandwidth and the initial channel profile obtained at FR1 that has high delay resolution.

It is to be noted that in addition to PDP, other metrics could be used as well for characterizing the propagation environment for the reference signal used. For example, channel impulse response (CIR), crest factor reduction (CFR), and/or multiple exit discriminator (MED).

Thus, in some example embodiments, a first delay grid with a fixed resolution and a selected length are initialized for the first PRS with the first bandwidth (B1). The fixed resolution may be 1/B1 and the selected length may be for example 5 microseconds. The delay grid may be used to determine a set of relevant delays for the first PRS. The set of relevant delays may also be referred to as a delay cluster selection or a delay region. The set of relevant delays may be denoted as {d1, ..., dL} The set of relevant delays are now determined for the first PRS. Then, for the second PRS with the second bandwidth (B2), another delay grid is determined with a fixed resolution, such as 1/B2, and a delay range, which can be denoted as [d1, ..., dL]. For the second PRS, the other delay grid may then be used to determine a set of relevant delays that may be denoted as {v1, ..., vK}. A TOA may now be chosen based on the set {v1, ..., vK}.

Figure 3:
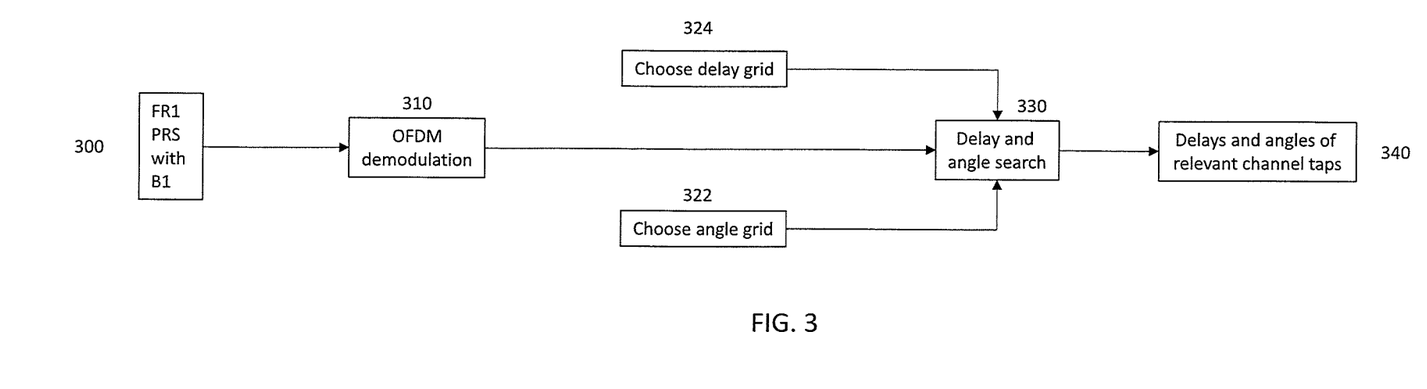
FIG. 3 illustrates a block diagram of an example embodiment of an angle of arrival estimator for frequency range 1.

FIG. 3 illustrates a block diagram of an example embodiment in which the block 230, the FR1 AOA estimator, of the example embodiment illustrated in FIG. 2B is illustrated in more detail. In this example embodiment, the terminal device receives, in block 300, an FR1 positioning signal of the bandwidth B1 and samples it with a resolution Ts=1/B1 that is inversely proportional to the first bandwidth. This is performed to obtain N signal samples, in which N=B1/fs, fs being the subcarrier spacing. The samples are collected in a vector r which is, in block 310, orthogonal frequency division modulation (OFDM) demodulated, that is, cyclic prefix (CP) is removed, and fast Fourier transform (FFT) is applied, to obtain the frequency-domain samples y. These can be expressed as y=WFhx+n, in which W is the received antennas response, h is the channel impulse response, x are the known transmitted signals, and n is additive white Gaussian noise (AWGN). F implements a Fourier transform of the impulse response h. The signal y may be approximated as y=WDhx+n, in which D implements a Fourier like operation on a delay grid of chosen resolution Tv, which is not necessarily equal to Ts. D is therefore an approximation of F, by assuming that the delays are placed on a given grid:

$$D(i, k) = \exp\left(2\pi j \frac{ikT_v}{NT_s}\right).$$

This is illustrated in block 324 in which the delay grid is chose. Using the above approximation, and an additional modelling assumption, i.e. h(k)=a(k) exp(j α$_k$)=a(k) exp(j kθ), θ is a chosen angle resolution, as illustrated in block 322, the task becomes that of finding the delays τ$_k$=kT$_v$ and angles α$_k$=kθ of the most relevant channel taps. For example, the problem may be formulated as $$\widehat{\tau_k}, \widehat{\alpha_k} = \mathrm{argmin}\|y - WDhx\|_2^2.$$

To solve it, for example Bayesian learning, greedy algorithms, or any heuristic methods based on grid searches, e.g. Newton method may be used. This is illustrated in block 330 in which delay and angle search is performed. As a result, delays and angles of all relevant channel taps are obtained as illustrated in block 340.

Figure 4:
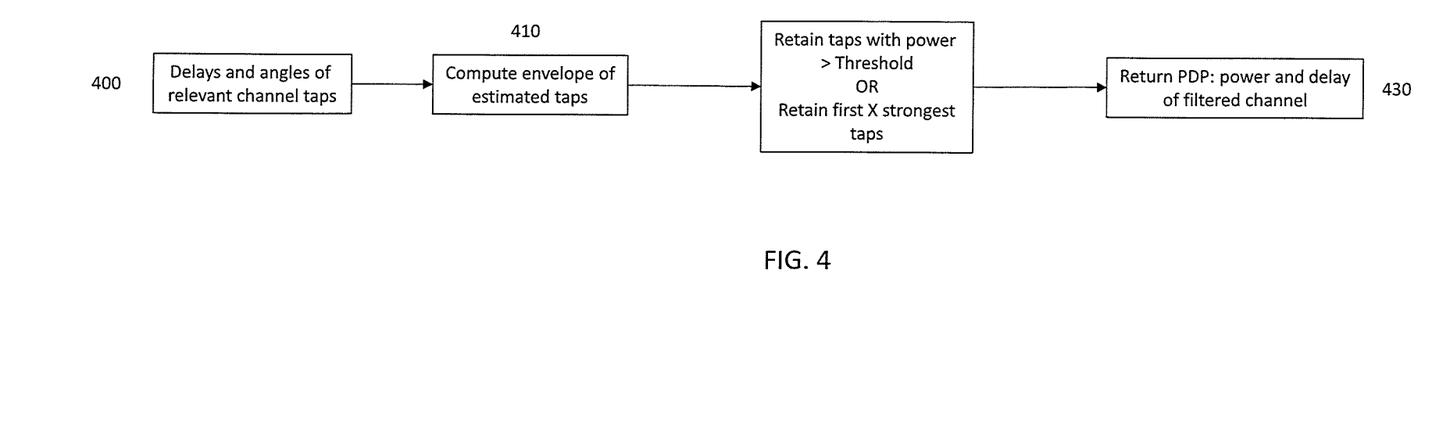
FIG. 4 illustrates a block diagram of an example embodiment of frequency range 1 resolution power delay profile estimator.

FIG. 4 illustrates an example embodiment of a FR1 coarse resolution PDP estimator. The example embodiment is illustrated as a block diagram, and it illustrates block 232 of the example embodiment of FIG. 2B in more detail. The output of block 340 illustrated in the example embodiment of FIG. 3 may be used to filter a relevant PDP. The delays and angles of relevant channel taps may be stored as illustrated in block 400. Their envelope may be computed and filtered as illustrated in block 410. It is to be noted that in some example embodiments only the taps with envelope above given threshold may retained. Further, in some example embodiment the first X strongest taps may be returned, where the value of X may be determined internally to be for example 10. These are illustrated in block 420. Then, in block 430, using the filtered channel, the power of the selected taps is computed and a pair of power and delay per tap is provided as output. In other words, PDP is returned with power and delay of filtered channel.

In the example embodiment of FIG. 2B, the block 234 provides as an output a delay cluster selection. Using that output, a relevant delay range may be generated for example as follows: for each selected delay dk, a range rk=[dk−d, dk+d] is selected, in which d=a/B2, a being a positive integer and B2 being the FR2 bandwidth. For example, a=2/3/ . . . . Each range rk is then concatenated into a relevant delay grid g=[r1, . . . , rk, rX]. The redefined range g is then returned.

Figure 5:
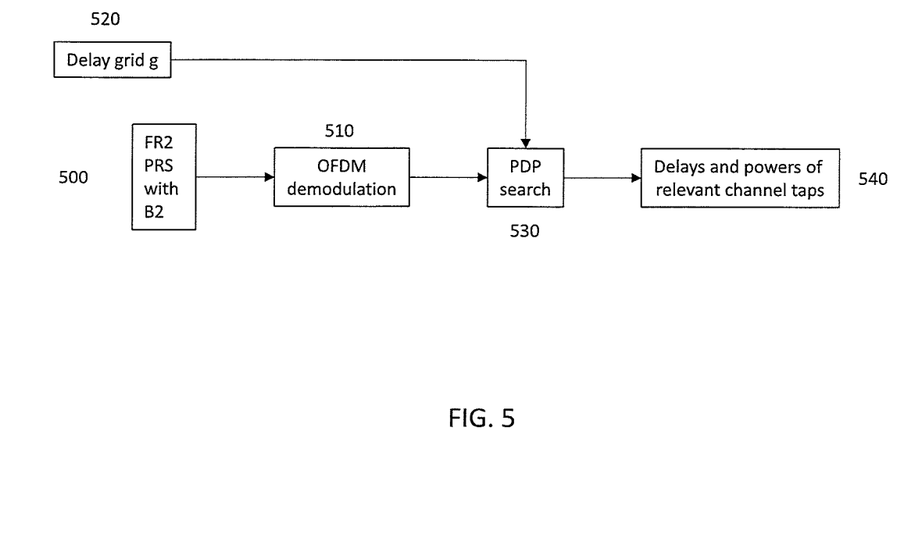
FIG. 5 illustrates a block diagram of an example embodiment of receiving a frequency range 2 reference signal.

FIG. 5 illustrates an example embodiment of receiving an FR2 positioning signal of bandwidth B2. The example embodiment is illustrated as a block diagram, and it illustrates block 236 of the example embodiment of FIG. 2 in more detail. In block 500 the terminal device receives the FR2 positioning signal of bandwidth B2 and samples it with a resolution Ts=1/B2 to obtain N signal samples, where N=B2/fs, fs being the subcarrier spacing. The samples are collected in the vector r which is OFDM demodulated, with CP removed and FFT is applied, to obtain the frequency-domain samples y. This is illustrated in block 510. These can be expressed as y=WFbx+n, where W is the received antenna response, b is the channel impulse response in FR2 band, x are the known transmitted signals, and n is AWGN. F implements a Fourier transform of the impulse response h. The signal y may be approximated as y=WGbx+n, where G implements a Fourier like operation on the delay grid g. Block 520 illustrates obtaining the delay grid g which is then provided as input to the block 530 in which PDP search is performed. To compute the PDP, the relevant taps on said grid are estimated. For example, this problem may be formulated as:

$$\widehat{\tau_k}, \widehat{p_k} = \mathrm{argmin}\|y - WGbx\|_2^2.$$

To solve it, one may resort to Bayesian learning, greedy algorithms, or any heuristic methods based on grid searches, e.g. Newton method. Once the PDP is returned, the TOA is computed as the delay of the first component, i.e. TOA=min{$\widehat{\tau_k}$, k=1, 2, . . . }. That is, in block 540 delays and powers of relevant channel taps are obtained. The relevant channel taps may comprise all relevant channel taps.

In the example embodiment of FIG. 2B, the block 238 provides as an output an estimation of the SNR and thus the block may be considered as an SNR estimator. Using the reconstructed channels h$_e$ and b$_e$ from blocks 230 and 236, the SNR estimator determines, which may be understood as computing, an SNR figure, such as noise variance per band. Available SNR estimators, such as minimum mean square error (MMSE) based estimators may be readily used for performing the determination in some example embodiments:

$$\sigma_1, \sigma_2 = \mathrm{argmin}\|y - WDh_e x\|_2^2 + \|y - WGb_e x\|_2^2.$$

In the example embodiment of FIG. 2B, the block 250 provides as an output a single anchor position estimation and may thus be called as a single anchor position estimator. An anchor in such a single position anchor may be a TRP and the first and the second PRS may then be receive from the same TRP. The SA position estimator receives as input the estimated AOA from block 230, the TOA from block 236, the SNR estimates and the location of the serving access node that may be a serving gNB to determine the location of the terminal device. For example, if the SNR is medium/high, a geometric approach may be used to compute the coordinates (xU, yU) of the terminal device: xU=xgNB+dist*cos(AOA), yU=ygNB+dist*sin(AOA), in which dist=TOA*c0, c0=3e8 m/s. For lower SNR range, i.e. when the SNR is below a certain threshold, the AOA and TOA estimates may be weighted differently, and/or more advanced localization methods may be used instead. It is to be noted that the SNR may be considered to be medium for example if its value is within the range of [−5, 3] dB, and high if its value is within the range of [3, 30] dB. As a further example, the SNR may be considered as low if its value is within the range [−15, −5] dB.

The example embodiments described above may be used for FR1 and FR2 enabled terminal devices with limited visibility to access nodes and for increasing the positioning accuracy. This may be beneficial for situations in which accurate location information is required in warehouses, obtaining automotive location in out of GNSS coverage situations and indoor positioning. Further, the example embodiments described above may have benefits such as reducing PRS detection and measurement overhead and reducing FR2 beam unreliability caused by quantization error of phase shifters It is to be noted that if a terminal device that employs the example embodiments described above, the terminal device may react to receiving a FR1 PRS in a bandwidth B1 by using the estimated PDP to generate a delay grid in which taps are deemed to be found with high probability. If the terminal device then receives FR2 PRS in a bandwidth B2>>B1, the terminal device may use the FR1 and FR2 PRS to compute an SNR estimate per bandwidth and use a SA positioning block and the TOA, ADA, SNR estimates and the TRP location to determine its own position. The position estimate may be additionally accompanied by a trust level, e.g. the position variance may also be returned. If the FR2 channel is similar to that of FR1, which may be an expected configuration, the expected result may be deemed. If the FR2 and FR1 channels are very different, which indicates a different source, this may not work for the positioning estimate as the delay grid does not match.

Figure 6:
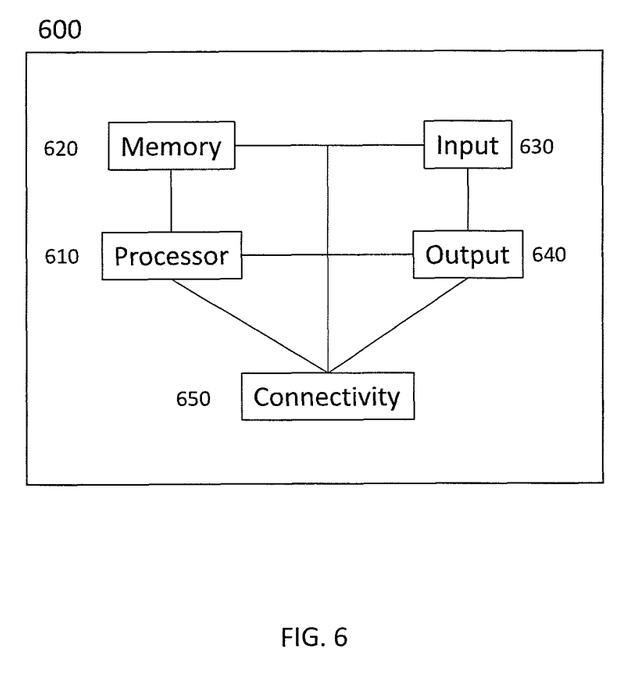
FIG. 6 illustrates an example embodiment of an apparatus.

FIG. 6 illustrates an apparatus 600, which may be an apparatus such as, or comprised in, a terminal device, according to an example embodiment. The apparatus 600 comprises a processor 610. The processor 610 interprets computer program instructions and processes data. The processor 610 may comprise one or more programmable processors. The processor 610 may comprise programmable hardware with embedded firmware and may, alternatively or additionally, comprise one or more application specific integrated circuits, ASICs.

The processor 610 is coupled to a memory 620. The processor is configured to read and write data to and from the memory 620. The memory 620 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 620 stores computer readable instructions that are execute by the processor 610. For example, non-volatile memory stores the computer readable instructions and the processor 610 executes the instructions using volatile memory for temporary storage of data and/or instructions.

The computer readable instructions may have been pre-stored to the memory 620 or, alternatively or additionally, they may be received, by the apparatus, via electromagnetic carrier signal and/or may be copied from a physical entity such as computer program product. Execution of the computer readable instructions causes the apparatus 600 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 600 further comprises, or is connected to, an input unit 630. The input unit 630 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 630 may comprise an interface to which external devices may connect to.

The apparatus 600 also comprises an output unit 640. The output unit comprises or is connected to one or more displays capable of rendering visual content such as a light emitting diode, LED, display, a liquid crystal display, LCD and a liquid crystal on silicon, LCoS, display. The output unit 640 further comprises one or more audio outputs. The one or more audio outputs may be for example loudspeakers or a set of headphones.

The apparatus 600 may further comprise a connectivity unit 650. The connectivity unit 650 enables wired and/or wireless connectivity to external networks. The connectivity unit 650 may comprise one or more antennas and one or more receivers that may be integrated to the apparatus 600 or the apparatus 600 may be connected to. The connectivity unit 650 may comprise an integrated circuit or a set of integrated circuits that provide the wireless communication capability for the apparatus 600. Alternatively, the wireless connectivity may be a hardwired application specific integrated circuit, ASIC.

It is to be noted that the apparatus 600 may further comprise various component not illustrated in the FIG. 6. The various components may be hardware component and/or software components.

Figure 7:
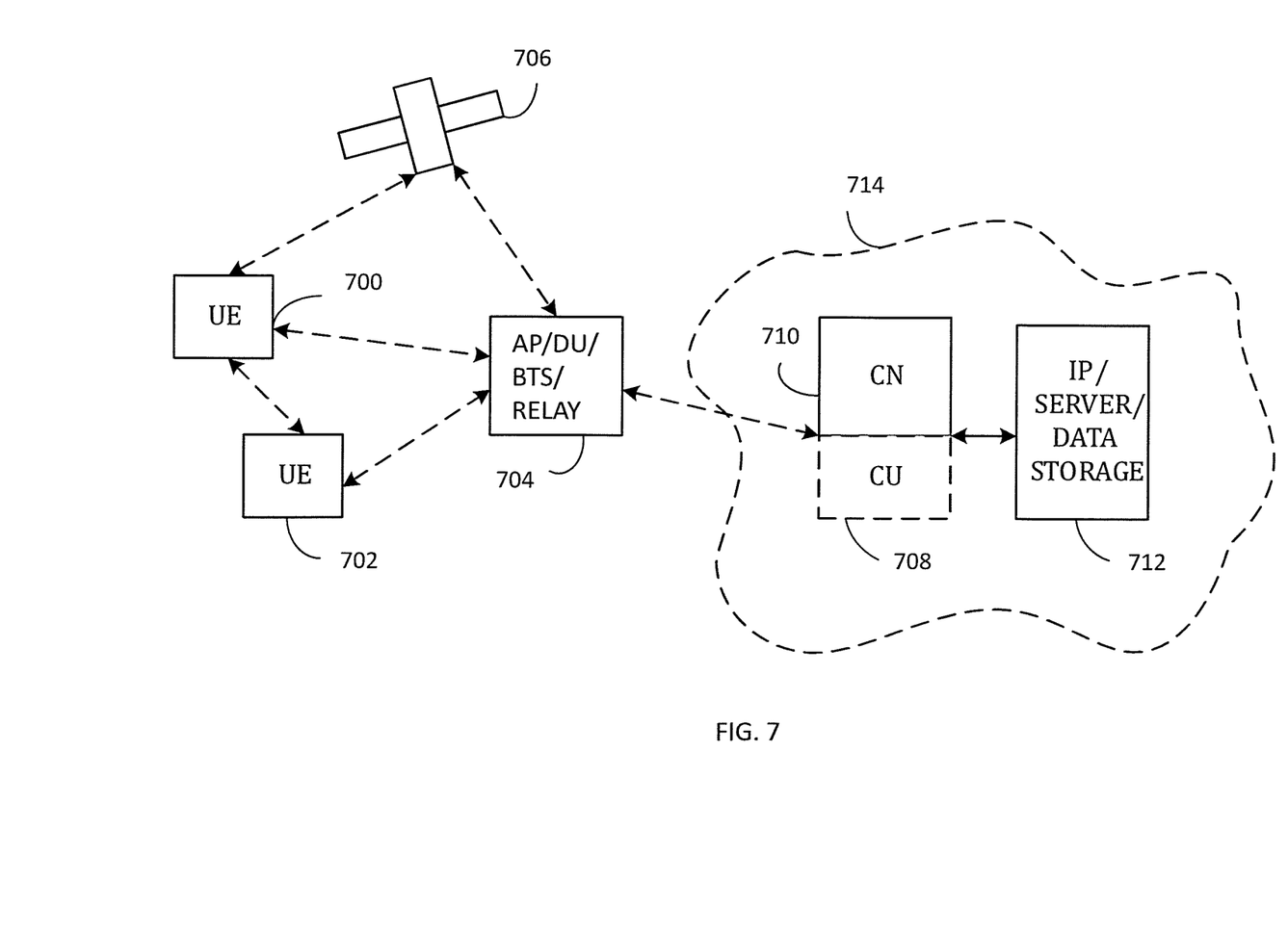
FIG. 7 illustrates an example embodiment of a cellular communication network.

FIG. 7 depicts examples of simplified system architectures showing some elements and functional entities, all being logical units, whose implementation may differ from what is shown. The connections shown in FIG. 7 are logical connections; the actual physical connections may be different. It is apparent to a person skilled in the art that the system may comprise also other functions and structures and any number of elements than those shown in FIG. 7. The example of FIG. 7 shows a part of an exemplifying radio access network.

FIG. 7 shows terminal devices, user equipments, UE 700 and 702, configured to be in a wireless connection on one or more communication channels in a cell with an access node (such as (e/g)NodeB) 704 providing the cell. The access node 704 may also be referred to as a node. The UE 700 may be in a wireless and/or wired connection with another UE 702. The wireless link from a terminal device to a (e/g)NodeB is called uplink or reverse link and the wireless link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this example embodiment, for the sake of simplicity of explanation, multiple cells may be provided by one access node in some example embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements such as at least one antenna panel. The (e/g)NodeB is further connected to core network 710 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device, UE, may refer to a portable computing device that comprises wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. A vehicle that is capable of connecting to cellular communication network may also be considered as a terminal device. It should also be appreciated that a user device may also be an exclusive or a nearly exclusive uplink only device, of which an example is a camera or video camera loading images or video clips to a network. A terminal device may also be a device having capability to operate in Internet of Things (IoT) network, or IIoT, in a scenario in which objects are provided with the ability to transfer data over a network without requiring human-to-human or human-to-computer interaction. The terminal device may also utilise cloud. In some applications, a terminal device may comprise a portable device with radio parts (such as a watch, earphones or eyeglasses) and the computation is carried out in the cloud. The terminal device (or in some embodiments a layer 3 relay node) is configured to perform one or more of user equipment functionalities.

Additionally, although the apparatuses have been depicted as single entities, different units, processors and/or memory units (not all shown in FIG. 7) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is distributed in the radio and centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 712, and/or utilise services provided by them. The communication network may also be able to support the usage of cloud services, for example at least part of core network operations may be carried out as a cloud service (this is depicted in FIG. 7 by "cloud" 714). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 704) and non-real time functions being carried out in a centralized manner (in a centralized unit, CU 708).

It should also be understood that the distribution of processing between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Satellite communication may utilise geostationary earth orbit (GEO) satellite systems, but also low earth orbit (LEO) satellite systems, for example, mega-constellations (systems in which hundreds of (nano) satellites are deployed). A satellite 706 comprised in a constellation may carry a gNB, or at least part of the gNB, that create on-ground cells. Alternatively, a satellite 706 may be used to relay signals of one or more cells to the Earth. The on-ground cells may be created through an on-ground relay node 704 or by a gNB located on-ground or in a satellite or part of the gNB may be on a satellite, the DU for example, and part of the gNB may be on the ground, the CU for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 7 may provide any kind of these cells. A cellular radio system may be implemented as a multilayer network including several kinds of cells. In some example embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 7). A HNB Gateway (HNB-GW), which may be installed within an operator's network may aggregate traffic from a large number of HNBs back to a core network.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
at least one processor, and
at least one memory storing instructions that, when executed with the at least one processor, cause the apparatus to:
receive a first reference signal, wherein the first reference signal is having a first bandwidth in a first frequency range;
determine an angle of arrival of a line of sight component of the first reference signal;
receive a second reference signal, wherein the second reference signal is having a second bandwidth in a second frequency range;
determine a time of arrival of a line of sight component of the second reference signal;
based on the first reference signal and on the second reference signal, determine a link quality measure; and
based on the link quality measure, the time of arrival and the angle of arrival, perform a position estimation to obtain an estimated position,
wherein the first reference signal and the second reference signal are received from a same transmit-receive point; and
wherein the instructions, when executed with the at least one processor, cause the apparatus to align the angle of arrival with a global coordinate system.

2. The apparatus of claim 1, wherein the instructions, when executed with the at least one processor, cause the apparatus to estimate, based on the first reference signal, a first channel metric with a first precision, and, based on the first channel metric and the first reference signal, select a delay range.

3. The apparatus of claim 2, wherein the instructions, when executed with the at least one processor, cause the apparatus to, based on the second reference signal and the delay range, estimate a second channel metric with a second precision.

4. The apparatus of claim 3, wherein the time of arrival of a line of sight component of the second reference signal is determined based on the second channel metric.

5. An apparatus according to claim 1, wherein the instructions, when executed with the at least one processor, cause the apparatus to obtain, based on the first channel metric, power and delay of each detected channel tap.

6. An apparatus according to claim 1, wherein the selecting of the delay range comprises determining a set of relevant delays and, using the first reference signal and using the set of relevant delays, updating the boundaries of the delay range.

7. An apparatus according to claim 1, wherein the estimated position is associated with a trust level.

8. An apparatus according to claim 7, wherein the trust level comprises a position variance.

9. An apparatus according to claim 1, wherein the first reference signal is a first positioning reference signal and/or the second reference signal is a second positioning reference signal.

10. An apparatus according to claim 1, wherein the link quality measure is a link quality measure determined for both, the first and the second, bandwidths.

11. An apparatus according to claim 1, wherein the link quality measure is one of the following: a signal to noise ratio, a signal to interference and noise ratio, reference signal received power or reference signal received quality.

12. A method comprising:
receiving a first reference signal, wherein the first reference signal is having a first bandwidth in a first frequency range;
determining an angle of arrival of a line of sight component of the first reference signal;
receiving a second reference signal, wherein the second reference signal is having a second bandwidth in a second frequency range;
determining a time of arrival of a line of sight component of the second reference signal;
based on the first reference signal and on the second reference signal, determining a link quality measure;
based on the link quality measure, the time of arrival and the angle of arrival, performing a position estimation to obtain an estimated position, wherein the first reference signal and the second reference signal are received from a same transmit-receive point; and aligning the angle of arrival with a global coordinate system.

13. A non-transitory program storage device readable by an apparatus, tangibly embodying a computer program product comprising instructions for causing an apparatus to perform at least the following:

receive a first reference signal, wherein the first reference signal is having a first bandwidth in a first frequency range;

determine an angle of arrival of a line of sight component of the first reference signal;

receive a second reference signal, wherein the second reference signal is having a second bandwidth in a second frequency range;

determine a time of arrival of a line of sight component of the second reference signal;

based on the first reference signal and on the second reference signal, determine a link quality measure;

based on the link quality measure, the time of arrival and the angle of arrival, perform a position estimation to obtain an estimated position, wherein the first reference signal and the second reference signal are received from a same transmit-receive point; and align the angle of arrival with a global coordinate system.

* * * * *